May 27, 1924.

J. H. CADDY

TRAP

Filed May 13, 1922  2 Sheets-Sheet 1

1,495,882

J. Caddy
INVENTOR
BY Victor J. Evans
ATTORNEY

WITNESS:

May 27, 1924.
J. H. CADDY
TRAP
Filed May 13, 1922    2 Sheets-Sheet 2
1,495,882
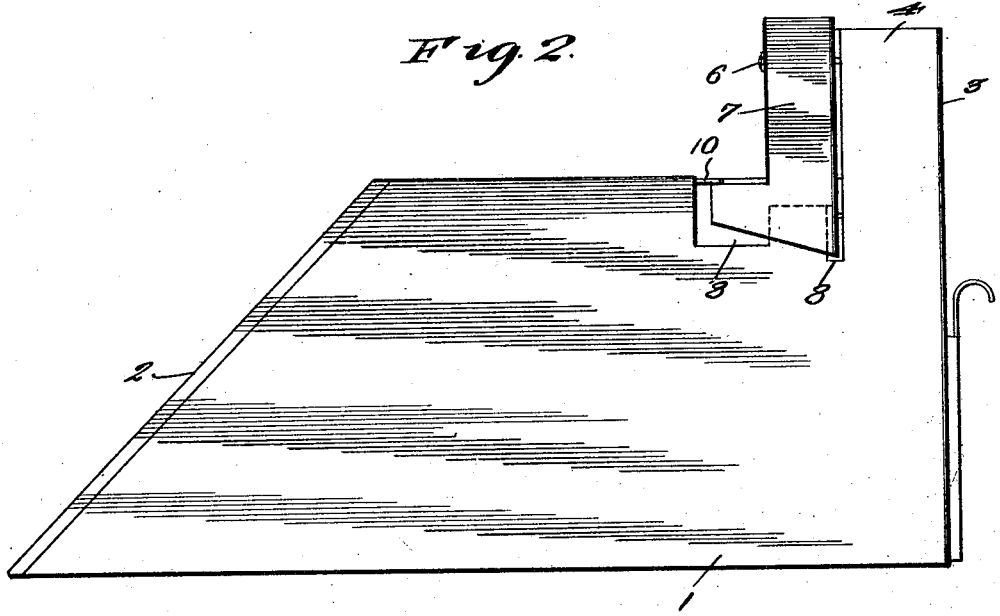
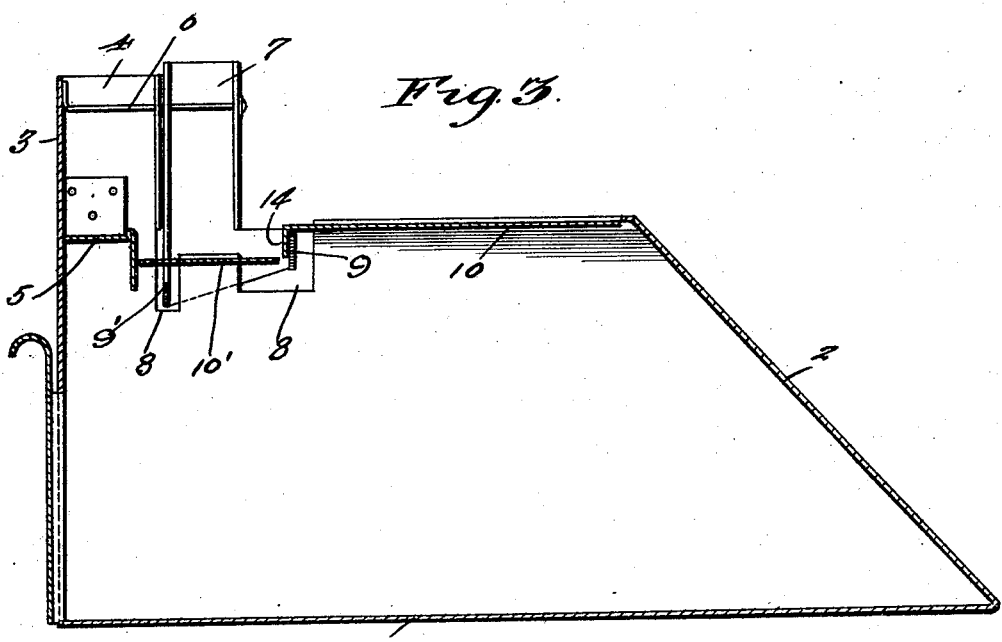

Patented May 27, 1924.

1,495,882

UNITED STATES PATENT OFFICE.

JAMES HENRY CADDY, OF SMYRNA, WASHINGTON.

TRAP.

Application filed May 13, 1922. Serial No. 560,796.

*To all whom it may concern:*

Be it known that I, JAMES HENRY CADDY, a citizen of the United States, residing at Smyrna, in the county of Grant and State of Washington, have invented new and useful Improvements in Traps, of which the following is a specification.

This invention relates to an animal trap, the general object of the invention being to provide means for catching the animals alive and means for making the trap self-setting.

Another object of the invention is to provide a pair of tilting platforms and a trigger, the first platform supporting the animal until it is released from the trigger by the animal stepping on the second platform so that the entire body of the animal is upon the platforms before they start to move.

Another object of the invention is to provide means for preventing animals from reaching the bait so that the trap will remain baited for a long period.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 2 is a side view.

Figure 3 is a sectional view.

Figure 1:
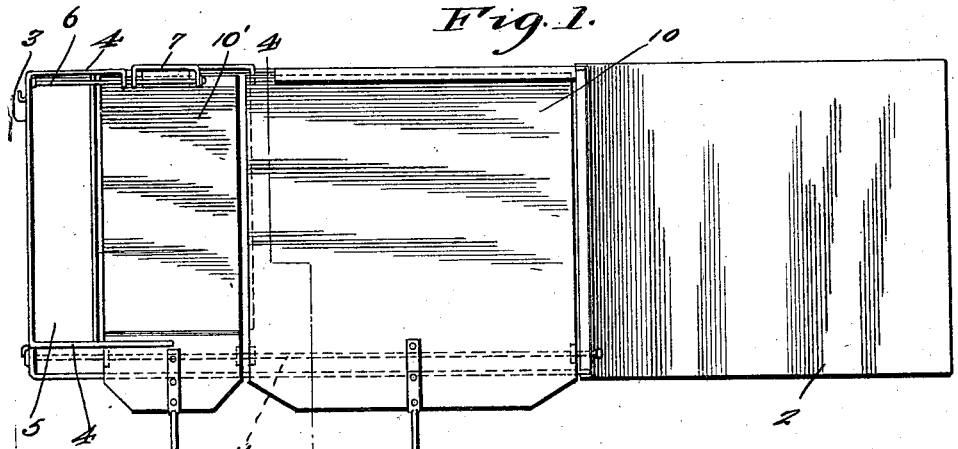
Figure 1 is a plan view of the invention.
Figure 4:
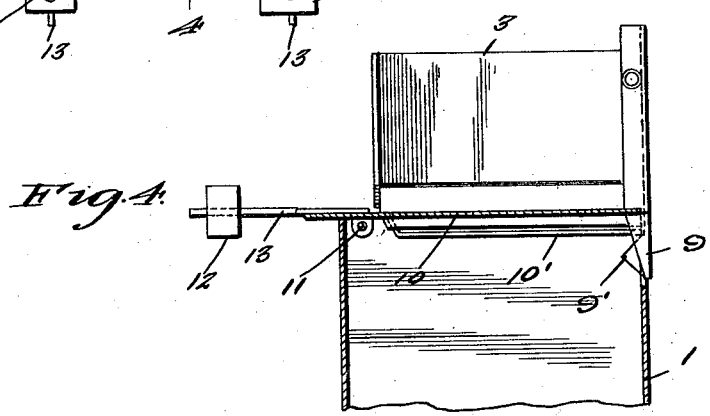
Figure 4 is a sectional view taken on line 4—4 of Figure 1.
Figure 5:
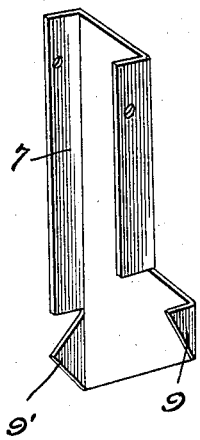
Figure 5 is a detail view of the trigger used in the construction of a trap.

In these views 1 indicates the body of the trap, which has one side sloping, as at 2, so that the animal can walk up the same to reach the top of the trap. The opposite side or end is extended, as at 3, at the top of the trap, with the ends of the extended portion bent, as at 4. A bait receptacle 5 is located in the space formed by this extended portion and its bent ends so that an animal is caused to travel across the top of the box or body to reach the bait. A rod 6 is supported by the extended portion, at one end thereof, and a trigger 7 is pivotally supported by this rod. One side of the box has its upper edge provided with notches 8 to receive the inwardly extending parts 9 and 9' of the trigger. The part 9 is provided with a straight upper edge and a sloping lower edge while both the upper and lower edges of the part 9' are sloping. A pair of tilting platforms 10 and 10' form the top of the trap, these platforms being supported by the rod 11 which passes through the ends of the box. These platforms are held in horizontal position by means of the weights 12 on the rods 13 which are secured to the projecting ends of the platforms. The platform 10 is of greater width than the platform 10' and said platform 10 is held in horizontal position by the part 9 of the trigger, one corner of the platform engaging the straight upper edge of said part 9. The platform 10' engages the inclined upper edge of the part 9' of the trigger, this platform 10' being located adjacent the bait box so that in order for an animal to reach the bait he must cross the platform 10 and then the platform 10'. The platform 10 is held against tilting movement under the weight of the animal by the trigger part 9 but as soon as the animal steps on the platform 10' its weight will cause the said platform to swing the trigger outwardly, due to its engagement with the inclined edge of the part 9', and thus free the platform 10 from the trigger. This will permit both platforms to swing downwardly under the weight of the animal and thus precipitate it into the body of the trap. The platforms will then swing upwardly again under the action of the weights 12. In this movement the platforms striking the inclined lower edges of the parts 9 and 9' of the trigger will cause the trigger to swing outwardly so that the platforms can pass by said parts and then the trigger will swing inwardly so that the said parts 9 and 9' will pass under the platforms and thus the trap will be set ready for the next animal.

I may make one of the platforms with an offset part 14 so that the major part of this platform is below the first platform. This will cause the animals to step down upon the platform 10', thus throwing most of his weight upon said platform to insure its tilting and throwing the trigger into a position to release the platform 10. As will be seen the platform 10 is much wider than the platform 10' as the second platform simply acts to throw the trigger from under the first platform.

By this invention the animal has its entire body upon the two platforms before the trigger is moved into releasing position so that there is no danger of scaring the animal before his body is entirely supported by the platforms.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A trap of the character described comprising a body opened at its top, an upwardly extending portion formed on one side wall of the body at one end thereof, a trigger pivotally secured to the upwardly extending portion and normally arranged parallel therewith, inwardly extending parts formed on the trigger and being provided with sloping lower edges, one of said parts being provided with a straight upper edge and the other part having a downwardly inclined edge, a platform pivoted to one side edge of the body and having its free end engaging the trigger part having the straight upper edge, a second platform pivoted to the body to swing in a plane below the first mentioned platform and adapted to engage the trigger part having the downwardly inclined upper edge, whereby the pressure upon the last mentioned platform will throw the trigger and release the first mentioned platform for movement simultaneously with the second mentioned platform.

In testimony whereof I affix my signature.

JAMES HENRY CADDY.